United States Patent [19]

Shani

[11] Patent Number: 4,535,246

[45] Date of Patent: Aug. 13, 1985

[54] FAST NEUTRON RADIOGRAPHY SYSTEM

[75] Inventor: Gad Shani, Beer-Sheva, Israel

[73] Assignee: Ben-Gurion University of the Negev Research & Development Authority, Israel

[21] Appl. No.: 405,776

[22] Filed: Aug. 6, 1982

[30] Foreign Application Priority Data

Aug. 7, 1981 [IL] Israel .......................................... 63529

[51] Int. Cl.$^3$ ............................................... G01T 3/00
[52] U.S. Cl. ................................. 250/390; 250/358.1; 250/392
[58] Field of Search ............... 250/358.1, 359.1, 360.1, 250/363 R, 363 S, 390, 391, 392, 327.2

[56] References Cited

U.S. PATENT DOCUMENTS

| | | | |
|---|---|---|---|
| 2,795,703 | 6/1957 | Berlman et al. | 250/392 |
| 4,152,598 | 5/1979 | Stewart | 250/392 |
| 4,217,496 | 8/1980 | Daniels et al. | 250/392 |
| 4,362,939 | 12/1982 | Horiuchi et al. | 250/358.1 |

Primary Examiner—Janice A. Howell
Attorney, Agent, or Firm—Sughrue, Mion, Zinn, Macpeak, and Seas

[57] ABSTRACT

A system for gamma-ray interference-free fast-neutron radiography is provided. The system comprises a radiation detector adapted to distinguish between neutron and gamma radiation, an imaging device transducing object-point related signals generated by the object-modified neutron and gamma radiation in the radiation detector. The system also includes a pulse-shaped discrimination and gating device for passing only neutron-induced image-producing pulses so as to filter out the gamma-ray induced, interfering signals.

12 Claims, 3 Drawing Figures

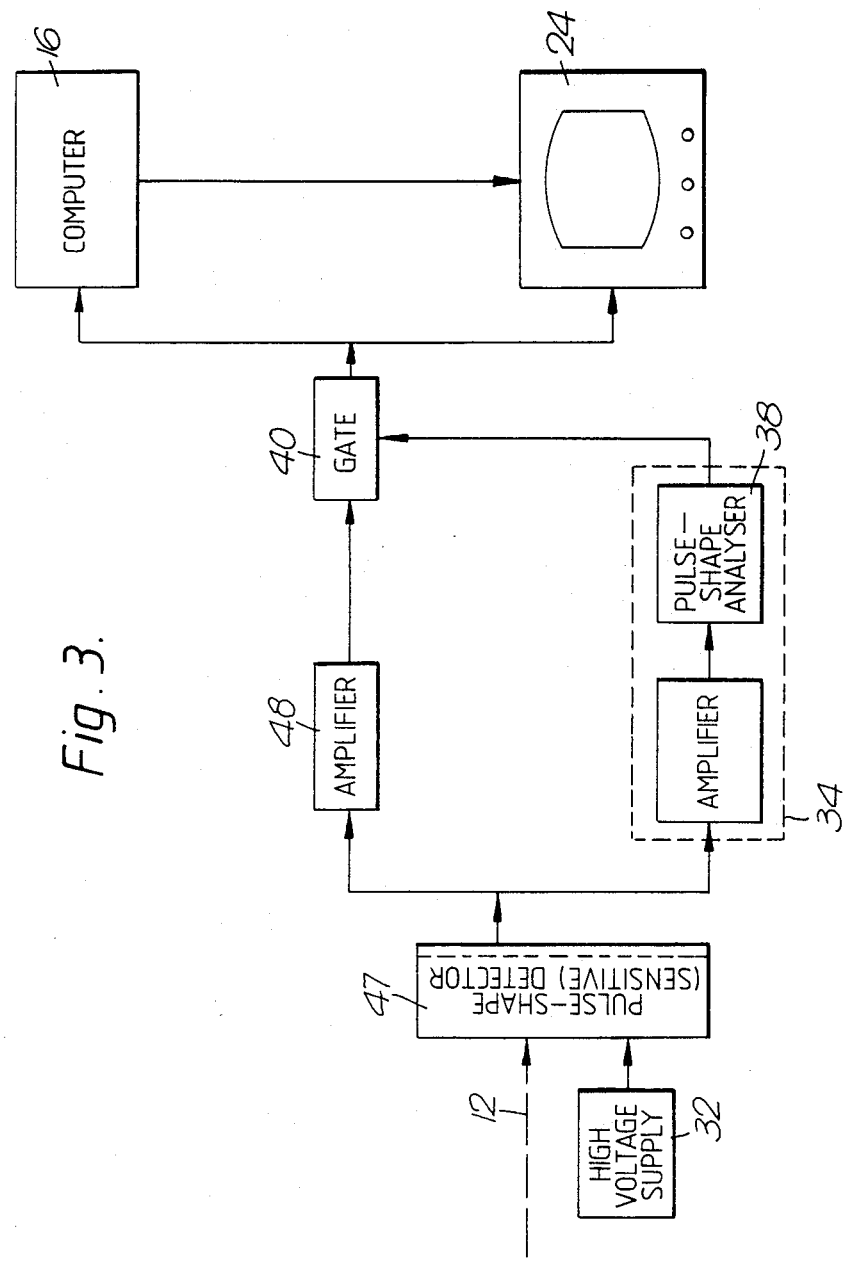

FAST NEUTRON RADIOGRAPHY SYSTEM

The present invention relates to a fast-neutron radiography system.

Radiography, widely used in medicine for diagnostic purposes, as well as in industry for nondestructive testing of materials and products, is in fact photography in which nuclear radiation is used instead of light.

The radiation penetrates the object so that the picture obtained is not that of the reflected radiation as in light photography, but that of the radiation transmitted through the object, hence of the internal zones of the object.

Several kinds of radiation are used for different purposes of radiography. Gamma (or X) radiation is high-energy electromagnetic radiation, not particle radiation. It interacts with the electrons of the atoms of the material it penetrates. The interaction probability is increased with increasing atomic number, i.e., the interaction probability is much higher with heavy elements. For this reason, in gamma radiography of the human body, the bones which contain calcium (Ca) are seen very clearly and organs consisting of muscle and fat are very difficult to observe.

The other kind of radiography available is neutron radiography. Neutrons are neutral particles, interacting with the atomic nucleus. Neutron interaction is more probable with light elements than with heavy elements. This is the reason that when tissue radiography is required, neutrons are used, not gamma rays. Neutron radiography can be done with slow (thermal) neutrons or with fast neutrons. Thermal neutron radiography is easier, because thermal neutrons are easier to obtain (by slowing down of neutrons from any source or from a nuclear reactor), easier to handle (shielding is simple and radiation hazards are smaller) and easier to detect. Several simple slow-neutron detectors are available. The disadvantage of thermal neutrons is that they cannot penetrate thick objects due to the high probability of their interacting with the material's nuclei.

Fast-neutron radiography is the other possibility. Fast neutrons are high-energy neutrons. While they do not interact with light elements as readily as slow neutrons, their disscrimination is still acute enough to permit radiographic distinction between muscle tissue (73% O, 12% C) and marrow or fat (12% O, 76% C) or detection of a change of density, the composition of tumors being similar to that of fat, and their density is in any case different from that of the surrounding tissues. Also, fast neutrons can penetrate thick objects. The main disadvantages of fast neutrons is the gamma radiation always accompanying them. The gamma rays are emitted from the same source as the fast neutrons and also from the surrounding materials, and cause the image to become fogged.

It is one of the objects of the present invention to permit utilization of fast neutrons for radiography, while eliminating the image-fogging effect of gamma radiation accompanying fast neutrons.

This the present invention achieves by providing a system for gamma-ray interference-free fast-neutron radiography, comprising a radiation detector adapted to distinguish between neutron and gamma radiation, imaging means transducing objectpoint related signals generated by said object-modified neutron-and gamma radiation in said radiation detector; and pulse-shape discrimination and gating means for passing only neutron-induced image-producing pulses, and for filtering out the gamma-ray induced, interferring signals.

In the present invention, fast-neutron radiography is performed using a technique known as "pulse-shape discrimination" (PSD) to eliminate gamma radiation effect. A TV camera monitors a scintillation radiation detector in which the radiograph of the inspected object is created. After filtering out the effect of the gamma radiation, the desired picture is seen on a CRT screen.

The technique of pulse shape discrimination for separation between gamma ray counting and neutron counting is well known. The two main techniques applied in the present invention are the improvement of the sensitivity of the TV camera to the scintillator light by using an image intensifier and the triggering of the TV camera or the image intensifier signal with the PSD pulse. If the TV camera is not fast enough to record the scintillator light pulse, a fast film or a fast charge or light-sensitive device, are used after the image intensifier.

The invention is based on the detection of fast neutrons after their passage through the inspected object. The neutron source can be either a radioactive source, or an accelerator. The use of a radioactive source is simple and cheaper than the use of an accelerator. Accelerators can be considered "cleaner" in the sense that they produce less gamma radiation. Californium 252 is a radioactive isotope; it undergoes spontaneous fission and thus emits neutrons. It seems to be a suitable source for the present purpose. $Cf^{252}$ is a very active isotope, so that a very small amount of it will be needed. 1 microgram of $CE^{252}$ emits $2 \times 10^6$ neutrons per second and about 10 micrograms will be needed. The exact source/intensity required depends on the dose to the patient and speed of radiography desired. The disadvantages of $Cf^{252}$ is that its half-life is about 2.5 years and the source has to be replaced every few years.

Several methods are available for neutron detection. There are gas-filled detectors which supply an electric pulse when a neutron is detected (i.e., has penetrated the detector and interacted with the gas). There are scintillating materials emitting a light pulse every time a neutron penetrates and interacts with the scintillator. The scintillator can be of the solid or liquid type. Additional methods are available for neutron detection.

There are two requirements the detection system must meet to be suitable for the present purpose. The first is that the neutron must be detected in such a way that it is possible to record the exact position of its detection, for accurate radiography. The second requirement is the elimination of the fogging gamma radiation effect. A liquid scintillator known as NE213 meets both requirements. Scintillation occurs at the location of the neutron interaction, hence if the neutron beam, after passing through the inspected object, represents the structure of the object, the scintillation pattern will represent the required image. The second requirement is achieved by using a property possessed by some scintillators, namely a radiation-dependent pulse shape. These scintillators (in particular NE213) emit light pulses whose length depends on the kind of radiation detected. Gamma radiation causes short pulses, neutrons and protons cause longer pulses and heavier particles cause even longer pulses.

While the invention will now be described in connection with certain preferred embodiments, it will be understood that it is not intended to limit the invention to these particular embodiments. On the contrary, it is intended to cover all alternatives, modifications and equivalent arrangements as may be included within the scope of the invention as defined by the appended claims. Nevertheless, it is believed that embodiments of the invention will be more fully understood from a consideration of the following illustrative description read in conjunction with the accompanying drawings, in which:

FIG. 3 is a partial block diagram of yet another embodiment, using a gas-filled radiation detector.

Figure 1:
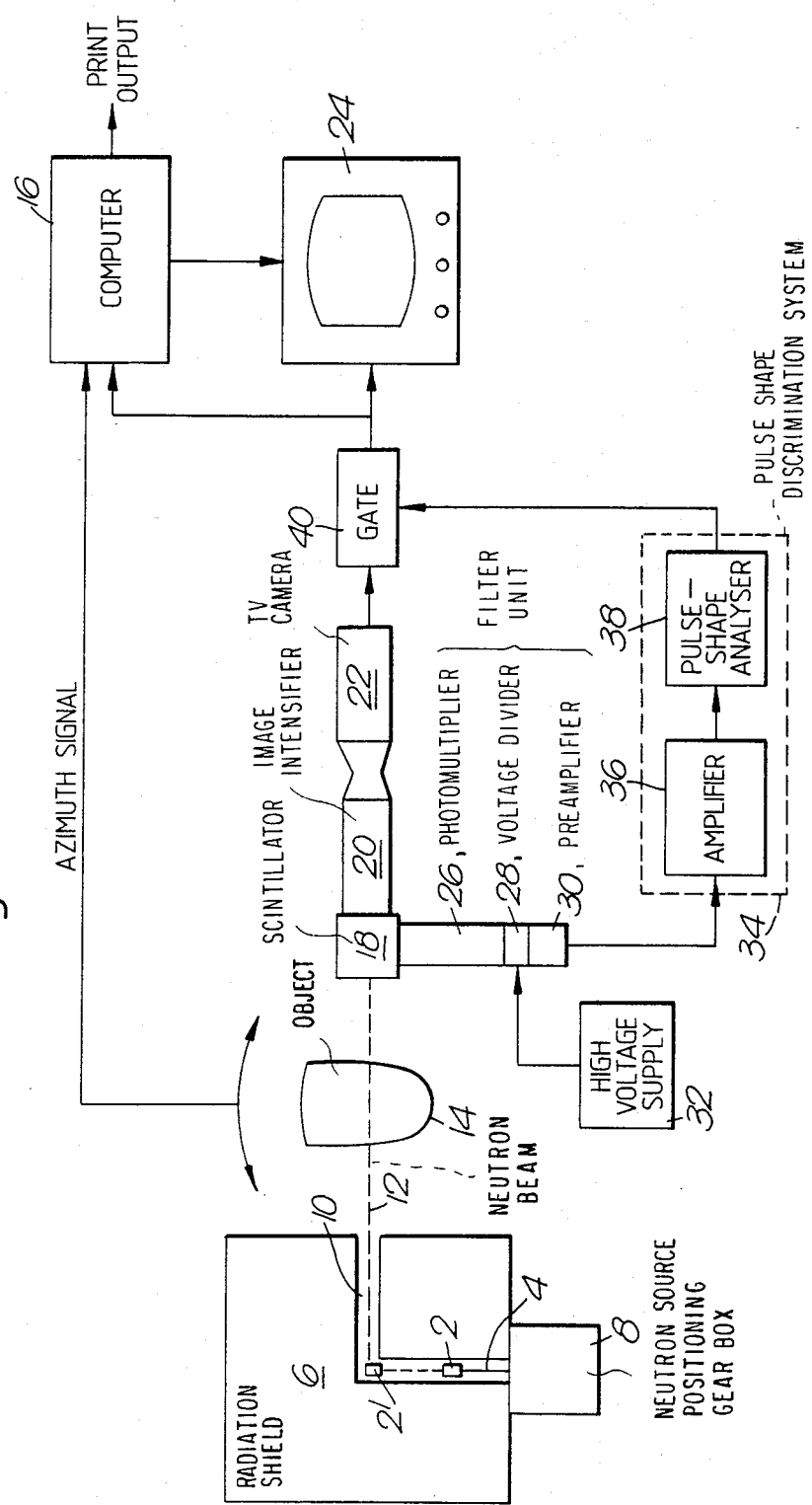
FIG. 1 is a block diagram of a first embodiment of the system according to the invention.

Referring now to the drawings, there is seen in FIG. 1 a neutron source 2, for instance Californium 252, mounted on an extensible positioner 4 and, when not in use, completely surrounded by a radiation shield 6. When about to be used, a positioning gear box 8 moves the source 2 to its operating position 2', in which it is located at the rear end of a relatively narrow bore 10 from which emerges the neutron beam 12 which, as explained earlier, also contains a gamma-radiation component. The object (or subject) 14 placed in the path of the beam 12, is rotatable about an axis perpendicular to the beam axis, a corresponding azimuth signal being delivered to a computer device 16. Having passed the object 14, the thus modified beam 12 enters a radiation detector 18 which, in this particular embodiment, is a scintillator, for instance of the type NE213, which is known to exhibit the above-discussed property of producing light pulses of a shape, i.e., duration which depends on the type of radiation impinging on the scintillator. Thus neutrons produce a relatively long pulse, while gamma radiation generates relatively short pulses. The scintillations, the spatial arrangement of which within the scintillator corresponds now to the object points that have modified the transmitted radiation, both neutron and gamma, are now suitably amplified by an image intensifier 20, the output image of which is "seen" by a TV-camera 22. This image is, however, fogged by the superposition of an unwanted image produced by the interfering gamma radiation, which image has to be eliminated before the signals from the camera 22 reach the TV-monitor 24 and/or the memory of the computer 16. This is the task of a filter unit that comprises a photo-multiplier tube 26 (including a voltage divider 28, a preamplifier 30 and a HV-supply 32) which "sees" all scintillation, whether neutron- or gamma radiation-induced and produces preamplified pulses (longer for neutrons, shorter for gamma radiation) which are fed to a pulse-shape discrimination system 34. The latter includes an amplifier 36 and a pulse-shape analyzer 38 and controls a coincidence and gate system 40 interposed between the TV-camera and the monitor 24 and computer 16. Thus of the mixed camera signals which comprise neutron- as well as gamma radiation-generated signals, only the former are allowed to enter the monitor/computer unit, while the latter are filtered out by the gate system 40, resulting in a clear, non-fogged image.

Figure 2:
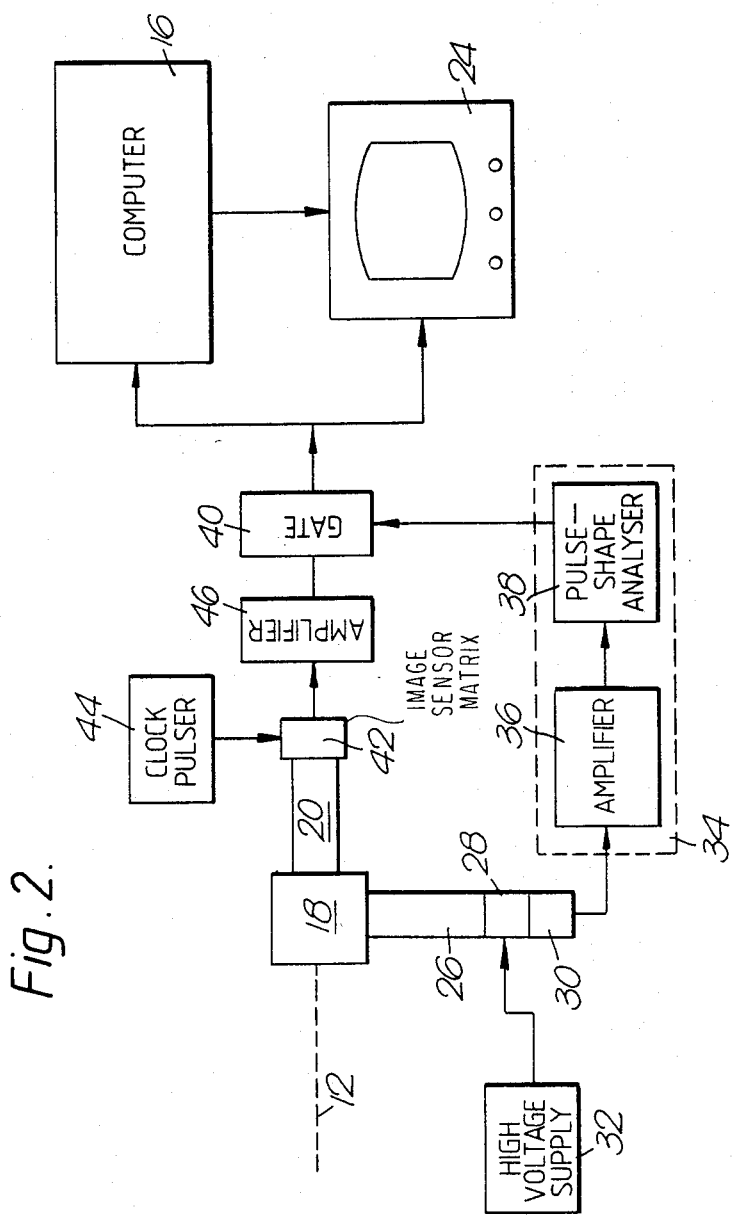
FIG. 2 is a partial block diagram of a second embodiment.

FIG. 2 is a partial block diagram of another embodiment, in which the TV-camera 22 of FIG. 1 has been replaced by an image-sensor matrix 42 including a clock pulser 44 and an amplifier 46.

Gas-filled radiation detectors are available which not only are position-sensitive, i.e., have an image-sensing matrix and are therefore capable of generating signals that, fed into the TV-monitor will produce an image, but also possess pulse-shape discrimination properties. Such a device could replace both the photomultiplier 26 and the TV-camera 32 of the embodiment of FIG. 1 (or the image sensor matrix 42 of FIG. 2).

FIG. 3 shows a block diagram of yet another embodiment using a radiation detector of this type. There is seen the gas-filled radiation detector 47, adapted to feed mixed (=neutron + gamma ray-induced) image signals to the monitor/computer 16, 24 via an amplifier 48 and the gate system 40. At the same time the pulse-shape sensitive detector 47 also generates pulse-shape signals to be fed to the pulse-shape discrimination system 34, to be analyzed for control of the gate 40, which will thus pass only the neutron-induced image pulses.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for gamma-ray interference-free fast-neutron radiography, comprising a radiation detector adapted to distinguish between fast-neutron and gamma radiation passing through an object, imaging means transducing object-point related signals generated by said object-modified neutron and gamma radiation in said radiation detector; pulse-shape discrimination and gating means for passing only neutron-induced image-producing pulses, and for filtering out the gamma-ray induced, interfering signals; and utilization means for receiving said neutron-induced image-producing pulses.

2. The system as claimed in claim 1, wherein said utilization means comprises means for visually monitoring said object-point related signals.

3. The system as claimed in claim 1, wherein said utilization means comprises computer means for storing said object-point related signals in its memory for further processing.

4. The system as claimed in claim 1, wherein said radiation detector is a liquid scintillator.

5. The system as claimed in claim 1, wherein said radiation detector is a solid scintillator.

6. The system as claimed in claim 1, wherein said radiation detector is a gas-filled detector having an image-sensing matrix.

7. The system as claimed in claim 1, wherein said imaging means is a TV-camera.

8. The system as claimed in claim 1, wherein said imaging means is an image-sensing matrix.

9. The system as claimed in claim 1, further comprising an image intensifier interposed between said radiation detector and said imaging means.

10. The system as claimed in claim 1, further comprising a photomultiplier interposed between said radiation detector and said pulse-shape discrimination and gating means.

11. The system as claimed in claim 1 further comprising a source of mixed fast neutron and gamma ray radiation; said radiation detector receiving said mixed radiation after the radiation has passed through the object and producing long light pulses corresponding to fast neutron-induced image information and short light pulses corresponding to gamma ray-induced interference signals; wherein said imaging means comprises a television camera for converting said long and short light pulses to corresponding long and short electrical pulses; and wherein said pulse-shape discriminator and gating means comprises pulse length discriminator means, coupled between said radiation detector and said utilization means, for gating only said long electrical pulses to said utilization means.

12. A method of producing a radiographic image of an object comprising the steps of:

irradiating the object with mixed fast-neutron and gamma-ray radiation from a common source to produce modified radiation containing object information;

converting the modified radiation to corresponding mixed light information;

converting the mixed light information to corresponding mixed electrical signals including first electrical signals corresponding to fast neutron-induced image information and second electrical signals corresponding to gamma ray-induced signals;

separating the first electrical signals from said second electrical signals; and transmitting said first electrical signals to an image-producing device.

* * * * *